US012694582B2

(12) United States Patent　　　　(10) Patent No.: US 12,694,582 B2
Zhai et al.　　　　　　　　　　　　(45) Date of Patent: Jul. 28, 2026

(54) METHOD, APPARATUS, ELECTRONIC DEVICE AND STORAGE MEDIUM FOR CONTROLLING BASED ON EXTENDED REALITY

(71) Applicant: Beijing Zitiao Network Technology Co., Ltd., Beijing (CN)

(72) Inventors: Jianxiong Zhai, Beijing (CN); Tan He, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 209 days.

(21) Appl. No.: 18/500,213

(22) Filed: Nov. 2, 2023

(65) Prior Publication Data

US 2024/0153159 A1　　May 9, 2024

(30) Foreign Application Priority Data

Nov. 3, 2022　(CN) .......................... 202211370292.9

(51) Int. Cl.
*G06T 11/10*　　　(2026.01)
*G06T 7/12*　　　(2017.01)

(52) U.S. Cl.
CPC ................ *G06T 11/10* (2026.01); *G06T 7/12* (2017.01); *G06T 2207/20132* (2013.01); *G06T 2210/22* (2013.01)

(58) Field of Classification Search
None
See application file for complete search history.

(56) References Cited

U.S. PATENT DOCUMENTS

2008/0117214 A1* 5/2008 Perani ................... G06T 11/206
　　　　　　　　　　　　　　　　　　　　345/441
2018/0276878 A1　 9/2018 Bunnell
2021/0020139 A1* 1/2021 Ekstrand .................. G06T 3/20
2024/0094862 A1* 3/2024 Dessero ................. G06F 3/013

FOREIGN PATENT DOCUMENTS

CN　　　108305328 A　　　7/2018
CN　　　110310356 A　 * 10/2019
CN　　　111766951 A　　 10/2020
　　　　　　　　(Continued)

OTHER PUBLICATIONS

Office Action for Chinese Patent Application No. 202211370292.9, mailed on Jun. 27, 2025, 22 pages.
(Continued)

*Primary Examiner* — Sarah Le
(74) *Attorney, Agent, or Firm* — Astute IP Law Group

(57) ABSTRACT

This disclosure provides a method, apparatus, electronic device, and storage medium for controlling based on extended reality. In some embodiments, this disclosure provides a method of controlling based on extended reality, including: displaying a virtual environment and a virtual screen located in the virtual environment in an extended reality space; and in response to displaying a played content on the virtual screen, rendering a light of the played content into a rendering region of the virtual environment to present a reflection of the played content in the rendering region of the virtual environment.

16 Claims, 5 Drawing Sheets

(56) References Cited

FOREIGN PATENT DOCUMENTS

| CN | 114140567 A | * | 3/2022 |
|----|-------------|---|--------|
| CN | 114549723 A |   | 5/2022 |
| CN | 114782612 A |   | 7/2022 |
| CN | 114845147 A |   | 8/2022 |
| CN | 114900625 A |   | 8/2022 |

OTHER PUBLICATIONS

Wang et al., "Research on Acceleration Methods for Virtual Reality Ray Tracing", Science and Technology & Innovation, Issue 14, Article No. 2095-6835, Jul. 25, 2016, 3 pages, with English Abstract.
Zhao, QinPing, "A survey on virtual reality", Science in China Series F: Information Science, vol. 52, No. 3, Mar. 11, 2009, 53 pages.
Notice of Allowance for Chinese Patent Application No. 202211370292. 9, mailed on Feb. 10, 2026, 6 pages.

* cited by examiner

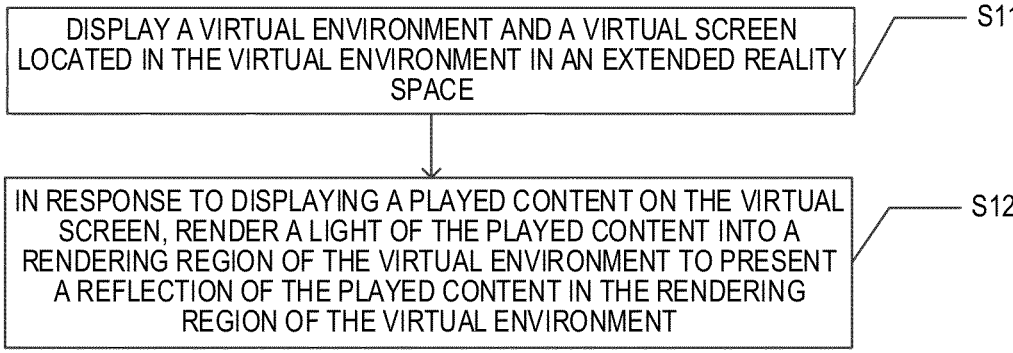

DISPLAY A VIRTUAL ENVIRONMENT AND A VIRTUAL SCREEN
LOCATED IN THE VIRTUAL ENVIRONMENT IN AN EXTENDED REALITY
SPACE

S11

IN RESPONSE TO DISPLAYING A PLAYED CONTENT ON THE VIRTUAL
SCREEN, RENDER A LIGHT OF THE PLAYED CONTENT INTO A
RENDERING REGION OF THE VIRTUAL ENVIRONMENT TO PRESENT
A REFLECTION OF THE PLAYED CONTENT IN THE RENDERING
REGION OF THE VIRTUAL ENVIRONMENT

METHOD, APPARATUS, ELECTRONIC DEVICE AND STORAGE MEDIUM FOR CONTROLLING BASED ON EXTENDED REALITY

CROSS REFERENCE

The present application claims priority to Chinese Patent Application No. 202211370292.9, filed on Nov. 3, 2022, and entitled "method, apparatus, electronic device and storage medium for controlling based on extended reality", the entirety of which is incorporated herein by reference.

FIELD

The present disclosure relates to the field of computer technology, and in particular to a method, apparatus, electronic device, and storage medium for controlling based on virtual display.

BACKGROUND

Extended reality technology includes virtual reality, augmented reality, mixed reality and other technologies. Images, videos and other frames can be display in the extended reality space. However, the display effects of the images and videos displayed in the extended display space are somewhat different from those in the real world, resulting in insufficient user experience.

SUMMARY

The present disclosure provides a method, apparatus, electronic device, and storage medium for controlling based on extended reality.

This disclosure employs the following technical solution.

In some embodiments, the present disclosure provides a method of controlling based on extended reality, comprising:

displaying a virtual environment and a virtual screen located in the virtual environment in an extended reality space; and in response to displaying a played content on the virtual screen, rendering a light of the played content into a rendering region of the virtual environment to present a reflection of the played content in the rendering region of the virtual environment.

In some embodiments, the present disclosure provides an apparatus for controlling based on extended reality, comprising:

a display unit configured to display a virtual environment and a virtual screen located in the virtual environment in an extended reality space; and a control unit configured to in response to displaying a played content on the virtual screen, render a light of the played content into a rendering region of the virtual environment to present a reflection of the played content in the rendering region of the virtual environment.

In some embodiments, the present disclosure provides an electronic device, comprising: at least one memory and at least one processor;

wherein the memory is configured to store program code, and the processor is configured to call the program code stored in the memory to perform the above method.

In some embodiments, the present disclosure provides a computer readable storage medium for storing program code that, when executed by a processor, causing the processor to perform the above method.

The present disclosure provides the method of controlling based on extended reality. When displaying the played content on the virtual screen, the light of the played content is rendered into the rendering region of the virtual environment, and the rendering region presents the reflection of the played content.

BRIEF DESCRIPTION OF THE DRAWINGS

In conjunction with the accompanying drawings and with reference to the following detailed description, the above and other features, advantages and aspects of the embodiments of the present disclosure will become more apparent. Throughout the drawings, the same or similar reference numerals indicate the same or similar elements. It should be understood that the drawings are illustrative and that components and elements are not necessarily drawn to scale.

FIG. 2 is a flowchart of a method of controlling based on extended reality in the embodiments of the present disclosure.

DETAILED DESCRIPTION

The embodiments of the present disclosure will be described in more detail with reference to the accompanying drawings, in which some embodiments of the present disclosure have been illustrated. However, it should be understood that the present disclosure can be implemented in various manners, and thus should not be construed to be limited to embodiments disclosed herein. On the contrary, those embodiments are provided for the thorough and complete understanding of the present disclosure. It should be understood that the drawings and embodiments of the present disclosure are only used for illustration, rather than limiting the protection scope of the present disclosure.

It should be understood that various steps described in method implementations of the present disclosure may be performed in different order and/or in parallel. Furthermore, method implementations may include additional steps and/or omit steps that are shown. The scope of the present disclosure is not limited in this regard.

The terms "comprise" and its variants used herein are to be read as open terms that mean "include, but is not limited to." The term "based on" is to be read as "based at least in part on." The term "one embodiment" is to be read as "at least one embodiment," the term "another embodiment" is to be read as "at least one another embodiment," and the term "some embodiments" is to be read as "at least some embodiments." Other definitions, explicit and implicit, might be included below.

It should be noted that concepts "first," "second" and the like mentioned in the present disclosure are only used to distinguish between different apparatuses, modules or units, rather than limiting the order or interdependence of the functions performed by these apparatuses, modules or units.

It should be noted that modifications "one" and "more" mentioned in the present disclosure are schematic and not limiting, and should be understood as "one or more" to those skilled in the art unless otherwise specified.

Names of messages or information exchanged between the plurality of apparatuses in implementations of the present disclosure are used for illustrative purposes only and are not intended to limit the scope of those messages or information.

The following will describe in detail the scheme provided in the present disclosure in conjunction with the accompanying drawings.

Figure 1:
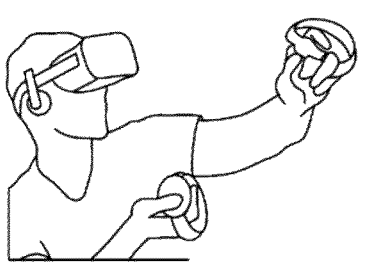
FIG. 1 is a schematic diagram of using a device for extended reality in the embodiments of the present disclosure.

Extended reality can be at least one of virtual reality, augmented reality, or mixed reality. Taking virtual reality as an example of extended reality, as shown in FIG. 1, users may enter the virtual reality space through intelligent terminal device such as headset VR glasses, and control their avatar to interact socially, entertain, learn, work remotely with other virtual characters controlled by other users in the virtual reality space.

Herein, the virtual reality space may be a simulation environment of the real world, or a semi-simulated and semi-fictional virtual scene, or a pure fictional virtual scene. The virtual scene may be any of two-dimensional virtual scenes, 2.5-dimensional virtual scenes, or three-dimensional virtual scenes. The embodiments of the present disclosure do not limit the dimensions of the virtual scenes. For example, a virtual scene may include sky, land, ocean, etc., and the land may include environmental elements such as deserts and cities. Users may control virtual objects to move in the virtual scene.

In one embodiment, in the virtual reality space, a user may achieve relevant interactive operations by operating a device, which may be a handle. For example, the user performs relevant operation controls by operating buttons of the handle. Of course, in other embodiments, control methods with gestures, or voice, or multi-modality may also be used to control a target object in the virtual reality device instead of using a controller.

In some embodiments of the present disclosure, the proposed method of controlling may be used for extended reality devices, such as virtual reality devices, which are terminals for implementing virtual reality effects, and may usually be provided as glasses, head Mount Display (HMD), and contact lenses for achieving visual perception and other forms of perception. Of course, the form of virtual reality device implementation is not limited to this, and may be further miniaturized or enlarged as needed.

The virtual reality device described in the embodiments of the present disclosure may include but is not limited to the following types.

Personal Computer Virtual Reality (PCVR) devices use the PC to perform relevant calculations and data output of virtual reality functions. External Personal Computer Virtual Reality devices use the data output from the PC to achieve virtual reality effects.

Mobile virtual reality devices support setting a mobile terminal (such as a smart phone) in various ways (such as a Head Mount Display with a dedicated card slot). The mobile terminal performs relevant calculations of virtual reality functions by connecting with the mobile terminal in a wired or wireless manner and outputs the data to the mobile virtual reality device, such as watching virtual reality videos through the APP of the mobile terminal.

The All-in-One virtual reality device has a processor for performing the relevant calculations of virtual functions, so it has independent virtual reality input and output functions and does not need to be connected to the PC or mobile terminal, with high freedom of use.

Virtual reality devices can present virtual reality images in the virtual reality space, and the underlying layer of virtual reality devices often uses operating systems such as Android and IOS.

As shown in FIG. 2, FIG. 2 is a flowchart of a method of controlling based on extended reality in the embodiments of the present disclosure, including the following steps.

At S11, display a virtual environment and a virtual screen located in the virtual environment in an extended reality space.

In some embodiments of the present disclosure, the method of controlling based on extended reality may be used for extended reality devices. The extended reality space may be a pure virtual space or a mixed space of virtual and reality. The virtual environment is a virtual environment in the extended reality space, which may refer to a scene formed by virtual objects. The virtual environment may include a virtual room formed by virtual objects such as walls, furniture, floors, etc., which are located in the extended reality space. The virtual environment has a virtual screen, which may be a virtual display or a virtual projection screen.

At S12, in response to displaying a played content on the virtual screen, render a light of the played content into a rendering region of the virtual environment to present a reflection of the played content in the rendering region of the virtual environment.

In some embodiments, the virtual screen may display a played content, which may be pictures, videos, etc. In the real world, if the played content is displayed on the screen, the environment where the screen is located should have reflection. For example, when the lights are turned off, if a video is played on the TV, there will be reflection of the video played by the TV on the wall next to the TV. In this embodiment, considering the real situation of the real world, when displaying the played content on the virtual screen, the light of the played content will be rendered to the rendering region of the virtual environment, and the rendering region will present the diffuse reflection of the played content, thereby simulating the effect when playing through the screen in the real world and improving the user's real experience.

In some embodiments, the rendering region in the virtual environment may depend on the virtual screen. For example, the rendering region may be a trapezoidal region extending outward for a certain distance from the four edges of the virtual screen. Because the outward propagation of light is radioactive, the rendering region may be four, which may be a trapezoidal region extending outward from the four edges of the virtual screen. In some embodiments, when the brightness of the virtual environment is less than a predetermined value, the light of the played content may be rendered into the rendering region of the virtual environment. Because when the brightness of the environment is greater than the predetermined value, the reflection of the played content should not be seen in regions such as walls under normal circumstances.

Figure 3:
FIG. 3 is a schematic diagram of the display of the virtual environment and virtual screen in the embodiments of the present disclosure.

In order to better illustrate the method proposed in the embodiments of the present disclosure, it is described below in conjunction with FIG. 3. FIG. 3 shows a pure virtual extended reality space. As shown in FIG. 3, the virtual environment shown in FIG. 3 is displayed in the extended reality space, which is a virtual room, including walls, furniture, etc. The virtual screen is displayed in the virtual environment, and a video is displayed as the played content on the virtual screen. It can be seen that the diffuse reflection of the video content of the virtual screen is displayed on the rendering regions of the virtual environment above, below, left, and right of the virtual screen, especially on the ground below the virtual screen in FIG. 3. The diffuse reflection light generated by the virtual screen may be clearly seen. In this embodiment, in the virtual environment, the simulated light emission not only displays the played content on the virtual screen, but also renders the light of the played content into the virtual environment. As the played content of the virtual screen changes, there will be reflection of the played content in the virtual environment around the screen (such as on the surface of objects in the virtual environment), which may simulate the effect of the light from the screen reflected into the room in scenes such as watching movies in a dark environment. This embodiment improves the user experience when watching virtual screens with extended reality devices and improves authenticity.

In some embodiments of the present disclosure, rendering the light of the played content into the virtual environment includes: obtaining a current content frame of the played content; determining a target content region corresponding to the rendering region in the virtual environment based on the current content frame and a position of the rendering region in the virtual environment; and rendering a color of the target content region to a corresponding rendering region in the virtual environment.

In some embodiments, the played content may not always be constant, so it is necessary to render the rendering region based on the current content frame. The number of rendering regions may include one or more regions, for example, the rendering region may include four regions, which may be four regions extending outward from the four edges of the virtual screen. For one rendering region, the reflection it may present is usually the reflection of the region closest to it in the current content frame. The part of the current content frame that is far away from the rendering region has almost no impact on the reflection presented in the rendering region. If the reflection of the rendering region is computed based on the entire current content frame, it will cause too much computation. For extended reality devices, they often cannot bear such computation pressure, resulting in the reflection presented cannot be synchronized with the current content frame, which will lead to a decrease in the user experience. Therefore, in this embodiment, a target content region corresponding to the rendering region is determined, and the target content region is part of the current content frame. Then, the target content region is rendered to the rendering region. Specifically, in some embodiments, a copied picture of the target content region may be generated, and then the copied picture is stretched to the same size as the rendering region, and then the copied picture is covered to the rendering region. For any position in the rendering region, it may be based on a color of the copied picture and an original color of the rendering region, and fused based on a fusion coefficient. Alternatively, it may be a generated copied picture of the target content region, or it may be set to semi-transparent, and then the semi-transparent copied picture is stretched to the same size as the rendering region, and then covered to the rendering region.

In some embodiments of the present disclosure, determining the target content region corresponding to the rendering region in the virtual environment based on the current content frame and the position of the rendering region in the virtual environment includes: determining a target edge of the virtual screen near the rendering region in the virtual environment; and cropping an edge region of the target edge in the current content frame as a corresponding target content region.

In some embodiments, taking FIG. 3 as an example, a floor region displayed in front of the sofa in FIG. 3 is a rendering region, and the edge of the virtual screen closest to the floor region is the lower edge of the virtual screen. Therefore, for the floor region, a corresponding target edge is the lower edge, and then the edge region of the lower edge is cropped from the current content frame as a target content region. In some embodiments, considering that the current content frame may have black edges, when obtaining the target content region, the black edges in the current content frame may be removed first, and then the edge region of the target edge may be cropped from the current content frame with the black edges removed. The length of the target content region may be equal to the length of the corresponding target edge, and its width may be a predetermined value. For example, the width of the target content region may be set to 10 cm.

In some embodiments of the present disclosure, before rendering the color of the target content region to the corresponding rendering region in the virtual environment, further includes: generating a noise map, so that coordinates of at least part of pixels in the target content region are produced offsets through the noise map.

Figure 4:
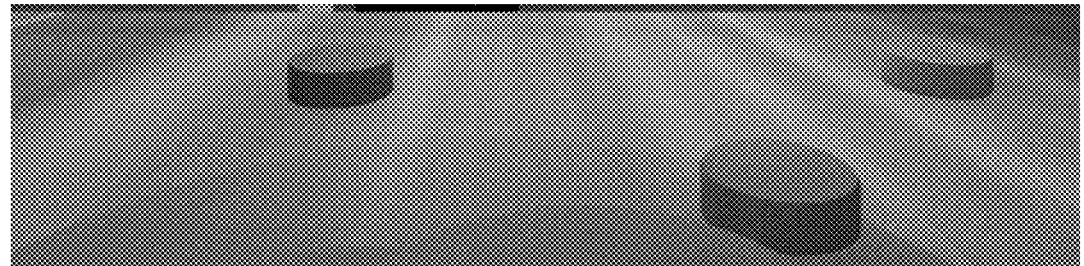
FIG. 4 is a schematic diagram of a reflective effect when a noise map is not used in the embodiments of the present disclosure.
Figure 5:
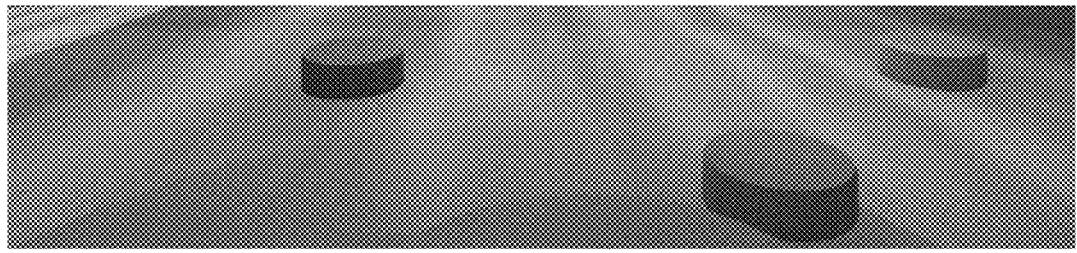
FIG. 5 is a schematic diagram of a reflective effect when the noise map is used in the embodiments of the present disclosure.

In some embodiments, as shown in FIG. 4, when the noise map is not used, the display effect is that the color of the target content region is directly rendered to the rendering region. It can be seen that the light projected onto the rendering region is a straight line. However, in the real world, due to the roughness of the object surface, when the light emitted by the screen hits the wall or ground, it should present a diffuse reflection style, that is, the emitted light should not be a straight line. Therefore, in this embodiment, the noise map will be used to process the target content region (where the target content region is extracted from the current content frame for rendering, and the current content frame displayed on the virtual screen will not be processed with the noise map), so that the coordinates of the pixels in the noise map are produced certain offsets. Due to the offsets of the pixel coordinates, the color of the offset target content frame will be rendered to the rendering region, and the diffuse reflection effect will be presented. The processed effect is shown in FIG. 5. It can be seen that the light hitting the rendering region presents a certain tortuous and divergent state, which is a diffuse reflection state, which is softer and more real. Specifically, in some embodiments, different positions on the noise map correspond to offset coefficients (the offset coefficients may be 0 to 1), and the coordinates of the reflected light are produced offsets by the noise map included: multiplying the pixel coordinates on the target content region by the offset coefficient of the corresponding point on the noise map to obtain the offset pixel coordinates. The position on the noise map may correspond to the position of the target content region one-to-one, and each position corresponds to an offset coefficient, which is used to offset the pixel coordinate of the pixel corresponding to the position, thereby causing the pixel to produce offset.

In some embodiments of the present disclosure, rendering the color of the target content region to the corresponding rendering region in the virtual environment includes: determining a fusion coefficient; determining a weight of the color of the target content region and an own color of the corresponding rendering region in the virtual environment based on the fusion coefficient; and fusing the color of the target content region with the own color of the corresponding rendering region in the virtual environment in accordance with respective weights to obtain a color displayed in the rendering region in the virtual environment.

In some embodiments, the proposed method simulates the diffuse reflection light of the played content of the rendering region in the virtual environment. Although the rendering region needs to present the color of the light (including the brightness of the color) of the played content, it should also present its own color. Therefore, the rendering region (specifically the object surface of the rendering region) needs to be fused based on the color of the rendering region and the own color of the rendering region, so as to obtain the color that the rendering region should present. The fusion coefficient may be a coefficient from 0 to 1, which may be predetermined. The total weight may be set to 1, and the fusion coefficient may be the weight of the color of the target content region. For example, if the fusion coefficient is 0.6, the weight of the color of the target content region is 0.6, and the weight of the own color of the rendering region is 0.4. In some embodiments, the step of determining a fusion coefficient; determining a weight of the color of the target content region and an own color of the corresponding rendering region in the virtual environment based on the fusion coefficient; and fusing the color of the target content region with the own color of the corresponding rendering region in the virtual environment in accordance with respective weights to obtain a color displayed in the rendering region in the virtual environment maybe processed by CPU.

In some embodiments of the present disclosure, before rendering the color of the target content region to the corresponding rendering region in the virtual environment further includes: setting, in different directions, a region size of a rendering region able to reflect the played content in the virtual environment.

In some embodiments, as shown in FIG. 3, the virtual screen is a rectangle, and different directions may be the directions toward each edge of the virtual screen. Therefore, the rendering region may include 4 regions, corresponding to the four edges (upper, lower, left and right edges) of the virtual screen, respectively. The reflective effects presented by different rendering regions are affected by the color of the edge regions of the corresponding edges and the rendering algorithm in different directions may be the same. In some embodiments, the impact of multiple different target content regions on the reflections presented by the rendering region may be ignored. That is, for a rendering region, the reflections presented will not be affected by two or more target content regions, but only by one target content region. Because if multiple target content regions are considered, the color mixing of multiple target content regions needs to be performed, and the algorithm complexity will be greatly increased. For example, when computing the reflection presented by the rendering region of the floor in FIG. 3, if the impact of the edge region on the left edge of the virtual screen and the edge region above it needs to be considered at the same time, the algorithm complexity will be greatly increased, and it is easy to cause Caton. As a result, the rendered reflection cannot be synchronized with the played content displayed on the virtual screen, resulting in a decrease in the user experience.

Figure 6:
FIG. 6 is a schematic diagram of a trapezoidal shape of a rendering region in the embodiments of the present disclosure.

In some embodiments of the present disclosure, the rendering region is trapezoid with a length of an upper bottom equal to a length of an edge of the played content in a direction of the rendering region. In some embodiments, as shown in FIG. 6, it schematically shows the relationship between the rendering region (the trapezoidal shape drawn in FIG. 6) and the edge of the virtual screen. For the rendering region, it is used to present reflection. In practice, the light emitted by the screen is radioactive and diffuses outward, so the rendering region is trapezoid. When determining a region size of the rendering region, it is necessary to determine the height of the trapezoid and the slope of the two hypotenuse edges. Because it is simulated light emitted from the virtual screen, the length of an upper bottom of the trapezoid (the short edge in the parallel edges of the trapezoid) is the same as that of the edge in the direction where the rendering region is located. In FIG. 6, the rendering region corresponding to the floor is located in the direction facing the lower edge of the virtual screen. Therefore, the length of the upper bottom of the trapezoid of the rendering region is the length of the bottom of the virtual screen.

In some embodiments of the present disclosure, rendering the color of the target content region to the corresponding rendering region in the virtual environment includes: simulating a diffuse reflection light of the light of the target content region illuminating the corresponding rendering region based on an angle between the virtual screen and the rendering region and the target content region, and displaying the diffuse reflection light in the rendering region.

Figure 7:
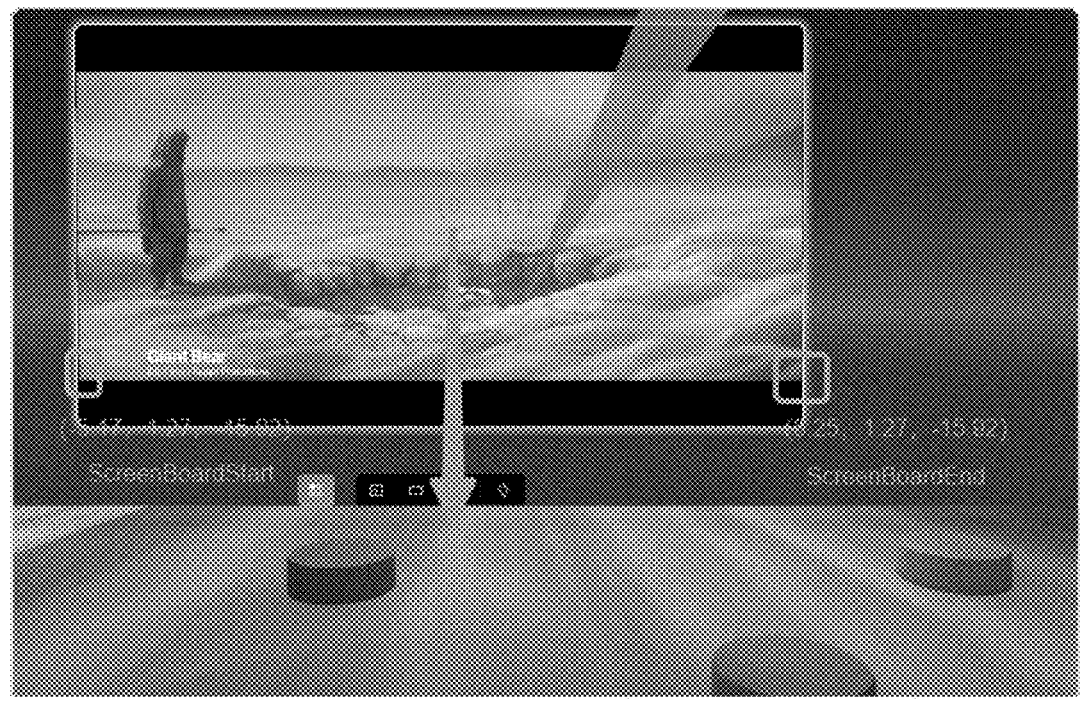
FIG. 7 is a schematic diagram of the virtual screen emitting light in the embodiments of the present disclosure.

In some embodiments, as shown in FIG. 7, when rendering the color of the target content region to the rendering region in the virtual environment, an angle of the virtual screen needs to be considered, because the diffuse reflection direction will differ under different angles. For example, in FIG. 7, the virtual screen is perpendicular to the rendering region of the floor. At this time, the light output of the virtual screen is set to hit towards the rendering region along a 45-degree angle. Based on this, when the angle between the virtual screen and the floor increases by a, the incident angle of the light output is controlled to increase by a/2, so that when the display screen is parallel to the floor, that is, when the angle between the two increases by 90 degrees, the incident angle increases by 45 degrees to reach 90 degrees. Based on the angle between the virtual screen and the rendering region, the light from the target content region is simulated to irradiate the rendering region to form diffuse reflection light, and the diffuse reflection light is displayed in the rendering region (specifically the object surface of the rendering region).

In some embodiments, the method further includes: performing processing of blurring edges of the light of the played content rendered into the virtual environment. For the light rendered into the virtual environment, it should not have too obvious boundaries. Therefore, the edges of the light rendered into the virtual environment are blurred, that is, the boundaries of the light rendered into the rendering area are blurred, which is more in line with the real situation and makes it more authentic.

In some embodiments, the method further includes: controlling an intensity of the light of the played content rendered into the virtual environment to decrease as the distance from the virtual screen increases based on a predetermined attenuation coefficient. In some embodiments, the brightness should gradually decrease as the distance emitted increases after the light is emitted, so an attenuation coefficient is set, and how the emitted light attenuates may be known through the attenuation coefficient. For example, the light intensity may be set to decay from 100% linear or nonlinear to 0% after the light is emitted 5 meters from the screen.

In some embodiments of the present disclosure, the method further includes: if a shadow region blocked by an object exists in the rendering region of the virtual environment, performing processing of fading the light of the played content projected into the shadow region.

In some embodiments, for the rendering region in the virtual environment, if there is an object in it and the object blocks the light emitted from the virtual screen, the region blocked by the object is also the shadow region. For the shadow region, if the specific value of its diffuse reflection needs to be computed, the computing power requirement is too high. Therefore, it may be considered that there is no shadow region first, the reflection that should be presented in the region under normal conditions without blocked is computed, and then the reflection of the shadow region is faded. For example, multiplying it by a predetermined coefficient (e.g., 0.1), which represents that the intensity, color, and other light parameters of the light rendered into the shadow area are 0.1 times that of normal situation, and then the faded reflection is presented in the shadow. This not only realizes the processing of the shadow region but also improves the computation speed.

In some embodiments of the present disclosure, an apparatus for controlling based on extended reality is further proposed, including:

a display unit configured to display a virtual environment and a virtual screen located in the virtual environment in an extended reality space; and a control unit configured to in response to displaying a played content on the virtual screen, render a light of the played content into a rendering region of the virtual environment to present a reflection of the played content in the rendering region of the virtual environment.

In some embodiments, rendering the light of the played content into the rendering region of the virtual environment includes: obtaining a current content frame of the played content;

determining a target content region corresponding to the rendering region in the virtual environment based on the current content frame and a position of the rendering region in the virtual environment; and rendering a color of the target content region to a corresponding rendering region in the virtual environment.

In some embodiments, determining the target content region corresponding to the rendering region in the virtual environment based on the current content frame and the position of the rendering region in the virtual environment includes:

determining a target edge of the virtual screen near the rendering region in the virtual environment; and cropping an edge region of the target edge in the current content frame as a corresponding target content region.

In some embodiments, before rendering the color of the target content region to the corresponding rendering region in the virtual environment, the control unit is further configured to:

generate a noise map, so that coordinates of at least part of pixels in the target content region are produced offsets through the noise map.

In some embodiments, rendering the color of the target content region to the corresponding rendering region in the virtual environment includes:

determining a fusion coefficient;

determining a weight of the color of the target content region and an own color of the corresponding rendering region in the virtual environment based on the fusion coefficient; and fusing the color of the target content region with the own color of the corresponding rendering region in the virtual environment in accordance with respective weights to obtain a color displayed in the rendering region in the virtual environment.

In some embodiments, before rendering the color of the target content region to the corresponding rendering region in the virtual environment, the control unit is further configured to:

set, in different directions, a region size of a rendering region able to reflect the played content in the virtual environment.

In some embodiments, the rendering region is trapezoid with a length of an upper bottom equal to a length of an edge of the played content in a direction of the rendering region.

In some embodiments, rendering the color of the target content region to the corresponding rendering region in the virtual environment includes: simulating a diffuse reflection light of the light of the target content region illuminating the corresponding rendering region based on an angle between the virtual screen and the rendering region and the target content region, and displaying the diffuse reflection light in the rendering region.

In some embodiments, the control unit is further configured to: perform processing of blurring edges of the light of the played content rendered into the virtual environment; and/or, control an intensity of the light of the played content rendered into the virtual environment to decrease as the distance from the virtual screen increases based on a predetermined attenuation coefficient.

In some embodiments, the control unit is further configured to: if a shadow region blocked by an object exists in the rendering region of the virtual environment, perform processing of fading the light of the played content projected into the shadow region.

For the embodiments of the apparatus, since it basically corresponds to the embodiments of the method, the relevant parts may be referred to the partial description of the embodiments of the method. The embodiments of the apparatus described above is only illustrative, and the units described as a separate unit may or may not be separate. Some or all of the units may be selected according to actual needs to achieve the purpose of the solution of the embodiments of the present disclosure. Those skilled in the art may understand and implement it without creative labor.

Above, the method and apparatus of the present disclosure have been described based on embodiments and application examples. In addition, the present disclosure also provides an electronic device and a computer-readable storage medium, which are described below.

Figure 8:
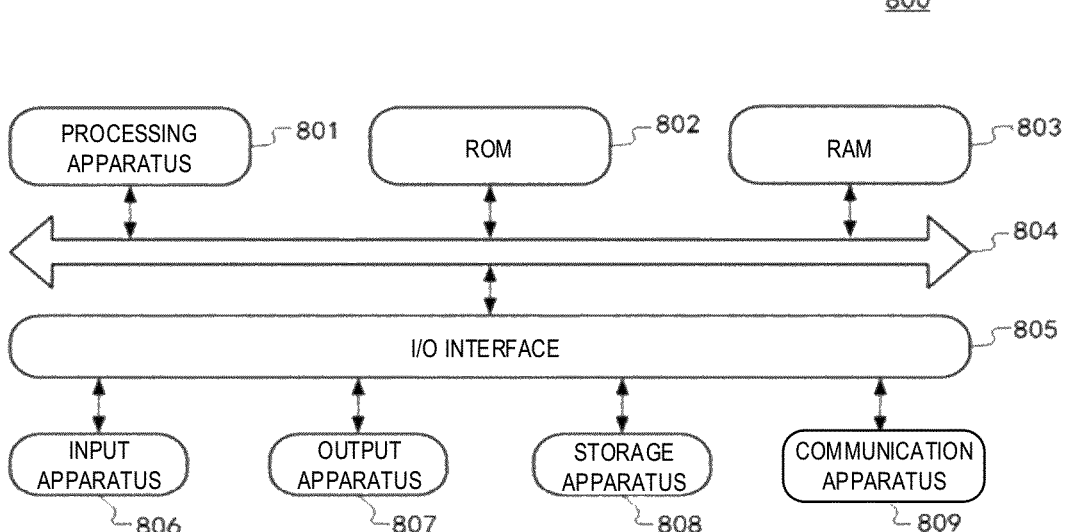
FIG. 8 is a structural schematic diagram of an electronic device of the embodiments of the present disclosure.

Referring now to FIG. 8, there is shown a schematic structural diagram of an electronic device (e.g., an terminal device or a server) 800 suitable for implementing embodiments of the present disclosure. The terminal device in the embodiments of the present disclosure may include, without limitation to, a mobile terminal such as a mobile phone, a laptop computer, a digital broadcast receiver, a PDA (personal digital assistant), a PAD (tablet computer), a PMP (portable multimedia player), an on-board terminal (e.g., on-board navigation terminal) and the like, as well as a fixed terminal such as a digital TV, a desktop computer and the like. The electronic device shown in the figure is merely an example and should not be construed to impose any limitations on the functionality and use scope of the embodiments of the present disclosure.

The electronic device 800 may comprise processor (e.g., a central processor, a graphics processor) 801 which is capable of performing various appropriate actions and processes in accordance with programs stored in a read only memory (ROM) 802 or programs loaded from memory 808 to a random access memory (RAM) 803. In the RAM 803, there are also stored various programs and data required by the electronic device 800 when operating. The processor 801, the ROM 802 and the RAM 803 are connected to one another via a bus 804. An input/output (I/O) interface 805 is also connected to the bus 804.

Usually, the following means may be connected to the I/O interface 805: input apparatus 806 including a touch screen, a touch pad, a keyboard, a mouse, a camera, a microphone, an accelerometers, a gyroscope, or the like; output apparatus 807, such as a liquid-crystal display (LCD), a loudspeaker, a vibrator, or the like; memory 808, such as a magnetic tape, a hard disk or the like; and communication apparatus 809. The communication apparatus 809 allows the electronic device 800 to perform wireless or wired communication with other device so as to exchange data with another device. While FIG. 8 shows the electronic device 800 with various means, it should be understood that it is not required to implement or have all of the illustrated means. Alternatively, more or less means may be implemented or exist.

Specifically, according to the embodiments of the present disclosure, the procedures described with reference to the flowchart may be implemented as computer software programs. For example, the embodiments of the present disclosure comprise a computer program product that comprises a computer program embodied on a non-transitory computer-readable medium, the computer program including program codes for executing the method shown in the flowchart. In such an embodiment, the computer program may be loaded and installed from a network via the communication apparatus 809, or installed from the memory 808, or installed from the ROM 802. The computer program, when executed by the processor 801, perform the above functions defined in the method of the embodiments of the present disclosure.

It should be noted that the computer readable medium of the present disclosure can be a computer readable signal medium, a computer readable storage medium or any combination thereof. The computer readable storage medium may be, for example, but is not limited to, an electronic, magnetic, optical, electromagnetic, infrared or semiconductor system, apparatus or device, or any combination of the foregoing. More specific examples of the computer readable storage medium may include, without limitation to, the following: an electrical connection with one or more conductors, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing. In the present disclosure, the computer readable storage medium may be any tangible medium including or storing a program that may be used by or in conjunction with an instruction executing system, apparatus or device. In the present disclosure, the computer readable signal medium may include data signals propagated in the baseband or as part of the carrier waveform, in which computer readable program code is carried. Such propagated data signals may take a variety of forms, including without limitation to electromagnetic signals, optical signals, or any suitable combination of the foregoing. The computer readable signal medium may also be any computer readable medium other than a computer readable storage medium that may send, propagate, or transmit a program for use by, or in conjunction with, an instruction executing system, apparatus, or device. The program code contained on the computer readable medium may be transmitted by any suitable medium, including, but not limited to, a wire, a fiber optic cable, RF (radio frequency), etc., or any suitable combination thereof.

In some implementations, the client and server may communicate utilizing any currently known or future developed network protocol such as HTTP (HyperText Transfer Protocol) and may be interconnected with digital data communications (e.g., communication networks) of any form or medium. Examples of communication networks include local area networks ("LANs"), wide area networks ("WANs"), inter-networks (e.g., the Internet), and end-to-end networks (e.g., ad hoc end-to-end networks), as well as any currently known or future developed networks.

The above computer readable medium may be contained in the above electronic device; or it may exist separately and not be assembled into the electronic device.

The above computer readable medium carries one or more programs which, when executed by the electronic device, cause the electronic device to perform the method of the disclosure above.

Computer program code for carrying out operations of the present disclosure may be written in one or more program designing languages or a combination thereof, which include without limitation to an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Units involved in the embodiments of the present disclosure as described may be implemented in software or hardware. The name of a unit does not form any limitation on the module itself.

The functionality described above may at least partly be performed, at least in part, by one or more hardware logic components. For example and in a non-limiting sense, exemplary types of hardware logic components that can be used include: field-programmable gate arrays (FPGA), application specific integrated circuits (ASICs), application specific standard products (ASSPs), systems on chips (SOCs), complex programmable logic devices (CPLDs), etc.

In the context of the present disclosure, the machine readable medium may be a tangible medium that can retain and store programs for use by or in conjunction with an instruction execution system, apparatus or device. The machine readable medium of the present disclosure can be a machine readable signal medium or a machine readable storage medium. The machine readable medium may include, but is not limited to, an electronic, magnetic, optical, electromagnetic, infrared or semiconductor system, apparatus or device, or any combination of the foregoing. More specific examples of the machine readable storage medium may include, without limitation to, the following: an electrical connection based on one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing.

According to one or more embodiments of the present disclosure, a method of controlling based on extended reality is provided, comprising:

displaying a virtual environment and a virtual screen located in the virtual environment in an extended reality space; and in response to displaying a played content on the virtual screen, rendering a light of the played content into a rendering region of the virtual environment to present a reflection of the played content in the rendering region of the virtual environment.

According to one or more embodiments of the present disclosure, the method of controlling based on extended reality is provided, wherein rendering the light of the played content into the rendering region of the virtual environment comprises:

obtaining a current content frame of the played content;

determining a target content region corresponding to the rendering region in the virtual environment based on the current content frame and a position of the rendering region in the virtual environment; and rendering a color of the target content region to a corresponding rendering region in the virtual environment.

According to one or more embodiments of the present disclosure, the method of controlling based on extended reality is provided, wherein determining the target content region corresponding to the rendering region in the virtual environment based on the current content frame and the position of the rendering region in the virtual environment comprises.

determining a target edge of the virtual screen near the rendering region in the virtual environment; and cropping an edge region of the target edge in the current content frame as a corresponding target content region.

According to one or more embodiments of the present disclosure, the method of controlling based on extended reality is provided, before rendering the color of the target content region to the corresponding rendering region in the virtual environment, further comprising:

generating a noise map, so that coordinates of at least part of pixels in the target content region are produced offsets through the noise map.

According to one or more embodiments of the present disclosure, the method of controlling based on extended reality is provided, wherein rendering the color of the target content region to the corresponding rendering region in the virtual environment comprises:

determining a fusion coefficient;

determining a weight of the color of the target content region and an own color of the corresponding rendering region in the virtual environment based on the fusion coefficient; and fusing the color of the target content region with the own color of the corresponding rendering region in the virtual environment in accordance with respective weights to obtain a color displayed in the rendering region in the virtual environment.

According to one or more embodiments of the present disclosure, the method of controlling based on extended reality is provided, before rendering the color of the target content region to the corresponding rendering region in the virtual environment, further comprising:

setting, in different directions, a region size of a rendering region able to reflect the played content in the virtual environment.

According to one or more embodiments of the present disclosure, the method of controlling based on extended reality is provided, wherein the rendering region is trapezoid with a length of an upper bottom equal to a length of an edge of the played content in a direction of the rendering region.

According to one or more embodiments of the present disclosure, the method of controlling based on extended reality is provided, wherein rendering the color of the target content region to the corresponding rendering region in the virtual environment comprises: simulating a diffuse reflection light of the light of the target content region illuminating the corresponding rendering region based on an angle between the virtual screen and the rendering region and the target content region, and displaying the diffuse reflection light in the rendering region.

According to one or more embodiments of the present disclosure, the method of controlling based on extended reality is provided, further comprising:

performing processing of blurring edges of the light of the played content rendered into the virtual environment; and/or, controlling an intensity of the light of the played content rendered into the virtual environment to decrease as the distance from the virtual screen increases based on a predetermined attenuation coefficient.

According to one or more embodiments of the present disclosure, the method of controlling based on extended reality is provided, further comprising:

if a shadow region blocked by an object exists in the rendering region of the virtual environment, performing processing of fading the light of the played content projected into the shadow region.

According to one or more embodiments of the present disclosure, an apparatus for controlling based on extended reality is provided, comprising:

a display unit configured to display a virtual environment and a virtual screen located in the virtual environment in an extended reality space; and a control unit configured to in response to displaying a played content on the virtual screen, render a light of the played content into a rendering region of the virtual environment to present a reflection of the played content in the rendering region of the virtual environment.

According to one or more embodiments of the present disclosure, an electronic device is provided, comprising: at least one memory and at least one processor;

wherein the at least one memory is configured to store program code, and the at least one processor is configured to call the program code stored in the at least one memory to perform any of the methods described above.

According to one or more embodiments of the present disclosure, a computer readable storage medium is provided, the computer readable storage medium is configured for storing program code that, when executed by a processor, causing the processor to perform the method described above.

The foregoing description is merely illustration of the preferred embodiments of the present disclosure and the technical principles used herein. Those skilled in the art should understand that the disclosure scope involved therein is not limited to the technical solutions formed from a particular combination of the above technical features, but should also cover other technical solutions formed by any combination of the above technical features or their equivalent features without departing from the above disclosure concepts, e.g., technical solutions formed by replacing the above features with technical features having similar functions disclosed (without limitation) in the present disclosure.

In addition, although various operations have been depicted in a particular order, it should not be construed as requiring that the operations be performed in the particular order shown or in sequential order of execution. Multitasking and parallel processing may be advantageous in certain environments. Likewise, although the foregoing discussion includes several specific implementation details, they should not be construed as limiting the scope of the present disclosure. Some features described in the context of separate embodiments may also be realized in combination in a single embodiment. On the contrary, various features described in the context of a single embodiment may also be realized in multiple embodiments, either individually or in any suitable sub-combinations.

Although the subject matter has been described in language specific to structural features and/or methodological logical actions, it should be understood that the subject matter defined in the appended claims is not necessarily limited to the particular features or actions described above. On the contrary, the particular features and actions described above are merely exemplary forms of implementing the claims.

What is claimed is:

1. A method of controlling based on extended reality, comprising:

displaying a virtual environment and a virtual screen located in the virtual environment in an extended reality space; and in response to displaying a played content on the virtual screen, rendering a light of a current content frame of the played content into a rendering region of the virtual environment to present a diffuse reflection of the current content frame of the played content in the rendering region of the virtual environment, wherein rendering the light of the current content frame of the played content into the rendering region of the virtual environment comprises:

obtaining the current content frame of the played content;

determining a content region corresponding to the rendering region in the virtual environment based on the current content frame and a position of the rendering region in the virtual environment; and rendering a color of the content region to the corresponding rendering region in the virtual environment;

wherein rendering the color of the content region to the corresponding rendering region in the virtual environment comprises:

generating a copied image of the content region, stretching the copied image to have a same size as the rendering region, and covering the copied image onto the rendering region;

wherein determining the content region corresponding to the rendering region in the virtual environment based on the current content frame and the position of the rendering region in the virtual environment comprises:

determining an edge of the virtual screen near the rendering region in the virtual environment; and cropping an edge region of the edge in the current content frame as the corresponding content region.

2. The method of claim 1, before rendering the color of the content region to the corresponding rendering region in the virtual environment, further comprising:

generating a noise map, so that coordinates of at least part of pixels in the target-content region are produced offsets through the noise map.

3. The method of claim 1, wherein rendering the color of the content region to the corresponding rendering region in the virtual environment comprises:

determining a fusion coefficient;

determining a weight of the color of the content region and an own color of the corresponding rendering region in the virtual environment based on the fusion coefficient; and fusing the color of the content region with the own color of the corresponding rendering region in the virtual environment in accordance with respective weights to obtain a color displayed in the rendering region in the virtual environment.

4. The method of claim 1, before rendering the color of the content region to the corresponding rendering region in the virtual environment, further comprising:

setting, in different directions, a region size of a rendering region able to reflect the played content in the virtual environment.

5. The method of claim 4, wherein, the rendering region is trapezoid with a length of an upper bottom equal to a length of an edge of the played content in a direction of the rendering region.

6. The method of claim 1, wherein, rendering the color of the content region to the corresponding rendering region in the virtual environment comprises: simulating a diffuse reflection light of the light of the content region illuminating the corresponding rendering region based on an angle between the virtual screen and the rendering region and the content region, and displaying the diffuse reflection light in the rendering region.

7. The method of claim 1, further comprising:

performing processing of blurring edges of the light of the played content rendered into the virtual environment; and/or, controlling an intensity of the light of the played content rendered into the virtual environment to decrease as the distance from the virtual screen increases based on a predetermined attenuation coefficient.

8. The method of claim 1, further comprising:

if a shadow region blocked by an object exists in the rendering region of the virtual environment, performing processing of fading the light of the played content projected into the shadow region.

9. An electronic device, comprising:

at least one memory and at least one processor;

wherein the at least one memory is configured to store program code, and the at least one processor is configured to call the program code stored in the at least one memory to perform acts comprising:

displaying a virtual environment and a virtual screen located in the virtual environment in an extended reality space; and in response to displaying a played content on the virtual screen, rendering a light of a current content frame of the played content into a rendering region of the virtual environment to present a diffuse reflection of the current content frame of the played content in the rendering region of the virtual environment, wherein rendering the light of the current content frame of the played content into the rendering region of the virtual environment comprises:

obtaining the current content frame of the played content;

determining a content region corresponding to the rendering region in the virtual environment based on the current content frame and a position of the rendering region in the virtual environment; and rendering a color of the content region to the corresponding rendering region in the virtual environment:

wherein rendering the color of the content region to the corresponding rendering region in the virtual environment comprises:

generating a copied image of the content region, stretching the copied image to have a same size as the rendering region, and covering the copied image onto the rendering region;

wherein determining the content region corresponding to the rendering region in the virtual environment based on the current content frame and the position of the rendering region in the virtual environment comprises:

determining an edge of the virtual screen near the rendering region in the virtual environment; and cropping an edge region of the edge in the current content frame as the corresponding content region.

10. The device of claim 9, the acts further comprising:

before rendering the color of the content region to the corresponding rendering region in the virtual environment, generating a noise map, so that coordinates of at least part of pixels in the content region are produced offsets through the noise map.

11. The device of claim 9, wherein rendering the color of the content region to the corresponding rendering region in the virtual environment comprises:

determining a fusion coefficient;

determining a weight of the color of the content region and an own color of the corresponding rendering region in the virtual environment based on the fusion coefficient; and fusing the color of the content region with the own color of the corresponding rendering region in the virtual environment in accordance with respective weights to obtain a color displayed in the rendering region in the virtual environment.

12. The device of claim 9, the acts further comprising:

before rendering the color of the content region to the corresponding rendering region in the virtual environment, setting, in different directions, a region size of a rendering region able to reflect the played content in the virtual environment.

13. The device of claim 9, wherein, rendering the color of the content region to the corresponding rendering region in the virtual environment comprises: simulating a diffuse reflection light of the light of the content region illuminating the corresponding rendering region based on an angle between the virtual screen and the rendering region and the content region, and displaying the diffuse reflection light in the rendering region.

14. The device of claim 9, the acts further comprising:

performing processing of blurring edges of the light of the played content rendered into the virtual environment; and/or, controlling an intensity of the light of the played content rendered into the virtual environment to decrease as the distance from the virtual screen increases based on a predetermined attenuation coefficient.

15. The device of claim 9, the acts further comprising:

if a shadow region blocked by an object exists in the rendering region of the virtual environment, performing processing of fading the light of the played content projected into the shadow region.

16. A non-transitory computer readable storage medium for storing program code that, when executed by a processor, causing the processor to perform a method, comprising:

displaying a virtual environment and a virtual screen located in the virtual environment in an extended reality space; and in response to displaying a played content on the virtual screen, rendering a light of a current content frame of the played content into a rendering region of the virtual environment to present a diffuse reflection of the current content frame of the played content in the rendering region of the virtual environment, wherein rendering the light of the current content frame of the played content into the rendering region of the virtual environment comprises:

obtaining the current content frame of the played content;

determining a content region corresponding to the rendering region in the virtual environment based on the current content frame and a position of the rendering region in the virtual environment; and rendering a color of the content region to the corresponding rendering region in the virtual environment;

wherein rendering the color of the content region to the corresponding rendering region in the virtual environment comprises:

generating a copied image of the content region, stretching the copied image to have a same size as the rendering region, and covering the copied image onto the rendering region;

wherein determining the content region corresponding to the rendering region in the virtual environment based on the current content frame and the position of the rendering region in the virtual environment comprises:

determining an edge of the virtual screen near the rendering region in the virtual environment; and cropping an edge region of the edge in the current content frame as the corresponding content region.

\* \* \* \* \*